(12) United States Patent
Haw

(10) Patent No.: US 8,506,161 B2
(45) Date of Patent: Aug. 13, 2013

(54) COMPENSATION OF STRAY LIGHT INTERFERENCE IN SUBSTRATE TEMPERATURE MEASUREMENT

(75) Inventor: Thomas Haw, Portland, OR (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 112 days.

(21) Appl. No.: 13/165,021

(22) Filed: Jun. 21, 2011

(65) Prior Publication Data

US 2012/0327970 A1 Dec. 27, 2012

(51) Int. Cl.
*G01J 5/00* (2006.01)
(52) U.S. Cl.
USPC ........... 374/121; 374/120; 374/179; 374/130; 374/132
(58) Field of Classification Search
USPC .......................... 374/121, 120, 179, 130, 132
See application file for complete search history.

(56) References Cited

U.S. PATENT DOCUMENTS

| | | | | |
|---|---|---|---|---|
| 4,984,902 A | * | 1/1991 | Crowley et al. | 374/1 |
| 5,755,511 A | | 5/1998 | Peuse et al. | |
| 5,988,874 A | * | 11/1999 | Rohner | 374/2 |
| 6,061,128 A | * | 5/2000 | Zweig et al. | 356/243.4 |
| 6,461,036 B1 | | 10/2002 | Shajii et al. | |
| 7,118,271 B2 | * | 10/2006 | Schonlein et al. | 374/2 |
| 7,452,125 B2 | * | 11/2008 | Volf et al. | 374/1 |
| 2004/0156045 A1 | * | 8/2004 | Zweig et al. | 356/243.4 |
| 2006/0176490 A1 | * | 8/2006 | Suzuki et al. | 356/479 |

FOREIGN PATENT DOCUMENTS

| | | | |
|---|---|---|---|
| JP | 04370722 A | * | 12/1992 |
| JP | 4370722 B | | 12/1992 |

OTHER PUBLICATIONS

Rabbani, Firoozeh, "International Search Report and Written Opinion re Application No. PCT/US2012/043163", Aug. 2, 2012, pp. 11 Published in: AU.

* cited by examiner

*Primary Examiner* — Freddie Kirkland, III
*Assistant Examiner* — Jamel Williams
(74) *Attorney, Agent, or Firm* — Neugeboren O'Dowd PC

(57) ABSTRACT

This disclosure describes systems, methods, and apparatuses for making a non-contact measurement of a substrate in a plasma processing chamber that accounts for stray blackbody radiation. In particular, a photocurrent is calculated that can be attributed to the stray blackbody radiation based upon a temperature of the stray blackbody radiation, a reflectance of a target substrate, and a temperature of the substrate. Knowing the photocurrent attributable to the stray blackbody radiation, a non-contact temperature measurement can be made, and the photocurrent attributable to the stray blackbody radiation can be subtracted out to arrive at a more accurate non-contact substrate temperature measurement.

12 Claims, 9 Drawing Sheets

COMPENSATION OF STRAY LIGHT INTERFERENCE IN SUBSTRATE TEMPERATURE MEASUREMENT

FIELD OF THE DISCLOSURE

The present invention relates generally to plasma processing. In particular, but not by way of limitation, the present invention relates to systems, methods and apparatuses for non-contact optical temperature measurements of a semiconductor substrate within a plasma processing chamber.

BACKGROUND

Radiation pyrometers are known and commercially available. Typically, pyrometers are used to optically measure the temperature of an object or "target." Pyrometers are particularly useful when the target is difficult to measure via conductive means (e.g., a thermocouple) because the target is very hot or very delicate, contacting the target could affect the temperature measurement, or because the target is difficult to access due to the hostility of the environment.

Pyrometers tend to be of two types: brightness or ratio devices. Brightness and ratio pyrometers both utilize a solution of a form of the Planck Radiation Equation to calculate the target's measured temperature. The Planck Radiation Equation for spectral radiation emitted from an ideal blackbody is:

$$L(\lambda) = \frac{2hc^2}{\lambda^5}\left[e^{\frac{hc}{\lambda k_B T}} - 1\right]^{-1} \quad \text{(Equation 1)}$$

where $L(\lambda)$=radiance in energy per unit area per unit time per steradian per unit wavelength interval, and where
  h=Plank's constant,
  c=the speed of light,
  $\lambda$=the wavelength of the radiation,
  $k_B$=Boltzman's constant, and
  T=the absolute temperature.

For non-blackbodies, the radiance $L(\lambda)$ can be modified by emissivity $\epsilon$ to give a radiance as follows:

$$H(\lambda) = \epsilon L(\lambda) = \epsilon \frac{2hc^2}{\lambda^5}\left[e^{\frac{hc}{\lambda k_B T}} - 1\right]^{-1} \quad \text{(Equation 2)}$$

Equation 2 can be rewritten in terms of photocurrent to derive Equation 3, which describes the photocurrent detected by a pyrometer:

$$P(\lambda) = \frac{c_1 \epsilon \alpha}{\lambda^5}\left[e^{\frac{c_2}{\lambda T}} - 1\right]^{-1} \quad \text{(Equation 3)}$$

Where $C_1$ is a constant equal to $2/\pi \ast h \ast c^2$, which is $3.74177 \ast 10^{-16}$ W/m$^2$, and $C_2$ is a constant equal to $$\frac{hc}{k_B}.$$

The variable $\alpha$ represents a sensor factor multiplied by a view factor, where the sensor factor represents a calibration of the pyrometer (e.g., the percentage of light that passes through optics of the pyrometer and/or optics of a view window of a processing chamber), and the view factor represents a percentage of all radiation from a source that is incident on a particular angular area. In other words, $\alpha$ is a variable that accounts for various factors that affect a ratio of the intensity of blackbody radiation emitted by an object divided by the intensity of blackbody radiation detected by the pyrometer (assuming blackbody-to-pyrometer radiation without reflections).

In the brightness method of pyrometry, $H(\lambda)$ and $\epsilon$ are measured at a known wavelength, $\lambda$, and, therefore, T can be calculated. Brightness devices rely upon capturing a known fraction of the radiation from a source in a particular solid angle. Brightness pyrometers tend to depend on knowing the emissivity of the target, as required by Equation 3, supra. Emissivity $\epsilon$ is the ratio of the radiation emitted by the target to the radiation emitted by a perfect blackbody radiator at the same temperature. Typically, emissivity is unknown or estimated to a low degree of accuracy. Additionally, the emissivity is often a function of the target temperature, wavelength of radiation examined, and history of the target. These factors greatly limit the utility of brightness pyrometry. For repetitive processing of uniformly prepared and controlled substrates, such as polished silicon wafers, this limit of repeatable temperature measurement is relieved somewhat.

In practice, it is left to the user of a brightness pyrometer to estimate the target emissivity, usually based upon an analysis of the target's composition. The target's thermal and environmental history can alter the emissivity to an unknown degree, as well as current environmental factors such as gases that absorb certain wavelengths of radiation en route from the target to the pyrometer.

Ratio pyrometers depend upon graybody behavior. A graybody is an energy radiator which has a blackbody energy distribution, times an emissivity, throughout a wavelength interval being examined. Ratio pyrometers detect the radiation intensity at two known wavelengths and, utilizing Planck's Equation, calculate a temperature that correlates to the radiation intensity at the two specified wavelengths.

SUMMARY

The present invention relates to systems, methods and apparatuses that can include, in one aspect, a method of making a non-contact temperature measurement of a target in a processing chamber. The method can include measuring a temperature of a reference target in the processing chamber, measuring a first temperature of the stray blackbody radiation, and measuring a reflectance of the reference target. The reference target can be replaced with a target, and a non-contact temperature measurement of the target can be made. The non-contact temperature measurement can include measuring a second temperature of the stray blackbody source, measuring a reflectance of the target, and with these two values, calculating a temperature of the target using at least the first temperature of the stray blackbody source, the second temperature of the stray blackbody source, the temperature of the reference target, the reflectance of the reference target, and the reflectance of the target.

In another aspect of the invention, a non-contact temperature-measuring device is described. This device can include a light beam source, a light beam detector, a first temperature monitor, a second temperature monitor, and a control module. The light beam source can emit a light beam having an emitted intensity. The light beam detector can detect: a first reflected intensity from the light beam reflecting off a reference target; and a second reflected intensity from the light beam reflecting off a target. The first temperature monitor can measure a first temperature of a stray blackbody source during a calibration phase, and can measure a second temperature of the stray blackbody source during a non-contact measurement phase. The second temperature monitor can measure a temperature of the reference target. The control module can determine the following: a first reflectance of the reference target as a ratio of the first reflected intensity over the emitted intensity; a second reflectance of the target as a ratio of the second reflected intensity over the emitted intensity; and a temperature of the target based on at least the first temperature, the second temperature, the third temperature, the first reflectance, and the second reflectance.

In yet another aspect of the invention a non-contact temperature measuring system can comprise a means for measuring a temperature of a reference target. The system can also comprise a means for measuring a first temperature of a stray blackbody radiation source during a calibration phase and measuring a second temperature of the stray blackbody radiation source during a non-contact temperature measurement phase. The system can further comprise a means for measuring a reflectance of the reference target and a reflectance of the target. The system can also include a means for calculating a temperature of the target based on at least: the temperature of the reference target; the first temperature of the stray blackbody radiation source; the second temperature of the stray blackbody radiation source; the reflectance of the reference target; and the reflectance of the target.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

FIG. 4b illustrates a side view of the embodiment of the pyrometer illustrated in FIG. 4a.

DETAILED DESCRIPTION

Figure 1:
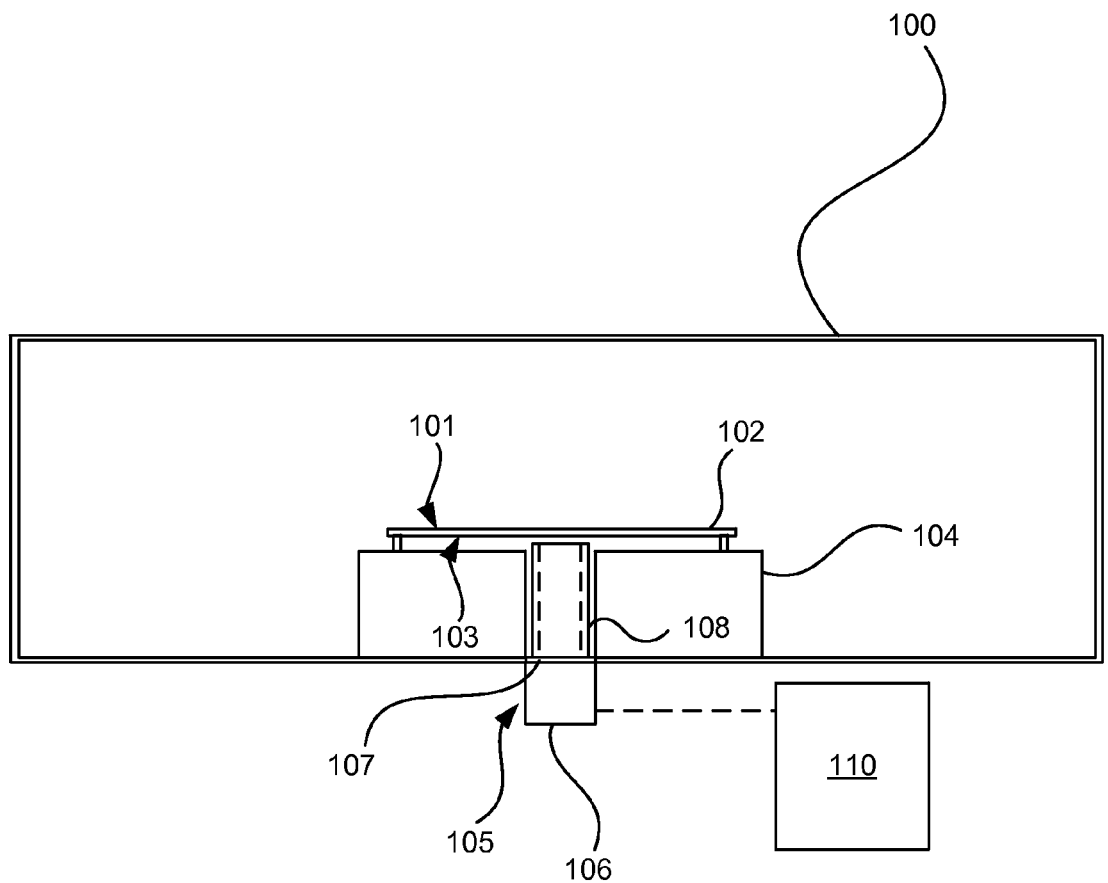
FIG. 1 illustrates an embodiment of a pyrometer measuring a substrate temperature.

FIG. 1 illustrates an embodiment of a semiconductor processing chamber 100 with a pyrometer 105 that measures a temperature of a substrate 102. The illustrated embodiment shows one way of optically measuring a temperature of a target or substrate 102 (e.g., a semiconductor substrate) within the processing chamber 100 via a non-contact temperature monitoring device (e.g., pyrometer 105) that enables non-contact temperature measurements of a semiconducing substrate 102 or other processing target to a degree of accuracy that accounts for or negates stray blackbody radiation.

In an embodiment, the semiconductor processing chamber 100 can be a plasma processing chamber for etching and deposition on the substrate 102 such as a semiconductor wafer or a photovoltaic polymer substrate. The substrate 102 can rest on a substrate holder 104 (e.g., a wafer chuck), and the pyrometer 105 can measure a temperature of the substrate 102 via transmitting light (e.g., infrared light) through a view window 107 in the processing chamber 100 and reflecting the light off a back or under surface 103 of the substrate 102 and detecting the reflected light that passes through the view window 107 to a light sensor or detector of the pyrometer 105.

The pyrometer 105 can include an electronics portion 106 containing electronics for generating, detecting, and analyzing the infrared light. The pyrometer 105 can also include a baffles 108 to reduce stray blackbody radiation from, for instance, the substrate holder 104 and the processing chamber 100 walls. The pyrometer 105 can be in communication with a circuitry or logic 110 by receiving instructions from the circuitry or logic 110 or providing data to the circuitry or logic 110. In an embodiment, the pyrometer 105 measures a temperature of the substrate 102, passes temperature data to the circuitry or logic 110, and the circuitry or logic 110 can modify various parameters of the processing chamber 100 controls (e.g., temperature, gas flow, RF power, to name just a few non-limiting examples).

The illustrated processing chamber 100 does not show various aspects of typical processing chambers that can be implemented, such as heating elements, gas pressure sensors, gas input and output ports, RF power sources, electrodes, etc. For instance, a heating element can be incorporated into or coupled to the substrate holder 104, and can be in thermal communication with the substrate 102. While the pyrometer 105 is centered under the substrate 102, this is not required. In some embodiments, the pyrometer 105 can be radially offset from the center of the substrate 102 and can direct light at a radially offset point or points on the substrate 102. Furthermore, while the electronics portion 106 is arranged outside of the processing chamber 100, in some embodiments, the pyrometer 105 can be arranged partially or completely within the processing chamber 100, and there may or may not be a view window 107. Nor is there a requirement that the pyrometer 105 direct light through an opening in the substrate holder 104 as illustrated. In some embodiments, the pyrometer 105 can direct light towards a top surface 101 of the substrate 102 or use mirrors or fiber optics to direct light to the bottom surface 103 of the substrate 102 without passing through the substrate holder 104. One skilled in the art will also recognize, in view of the specification, that a communication between the pyrometer 105 and the circuits or logic 110 is not required and in some cases the electronics portion 106 can share functionality with the circuits or logic 110. One skilled in the art will also recognize, in view of the specification, that the pyrometer 105 is not limited to infrared light.

Figure 2:
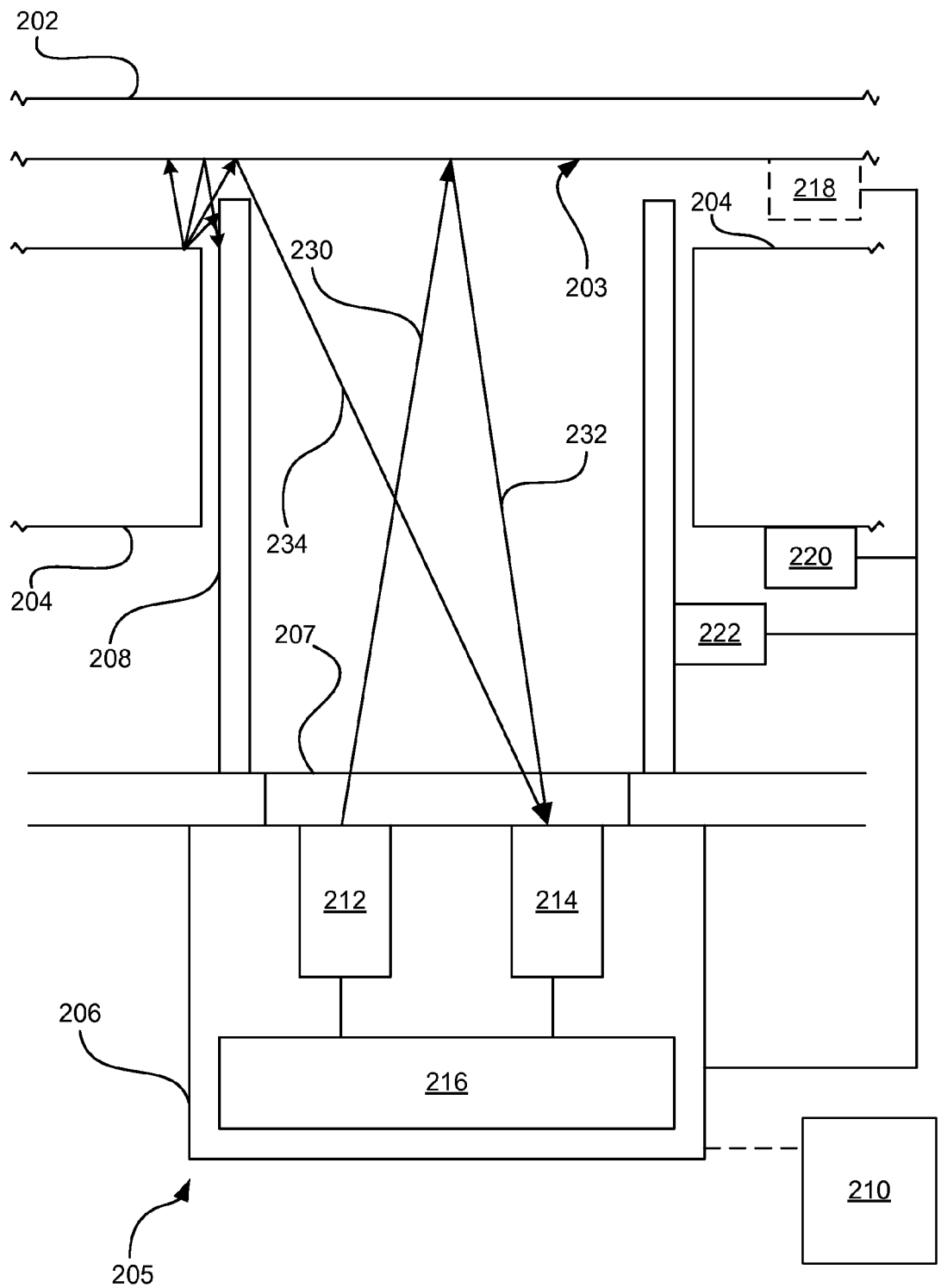
FIG. 2 illustrates a detailed view of an exemplary embodiment of the pyrometer of FIG. 1.

FIG. 2 illustrates an embodiment of a pyrometer 205, in communication with temperature monitors 218, 220, 222, that makes non-contact temperature measurements of the substrate 202 while accounting for stray blackbody radiation from the substrate holder 204 and other stray blackbody sources. The substrate 202 can rest on or be coupled to the substrate holder 204, and the pyrometer 205 can be arranged such that a light beam 230 can be directed through a view window 207 of the processing chamber 200 to a bottom surface 203 of the substrate 202 and reflected back to the pyrometer 205 through the view window 207 as a reflected light beam 232. The pyrometer 205 includes an electronics portion 206 having electronics and devices for generating the light beam 230, controlling various parameters of the light beam 230, detecting a reflected light beam 232, analyzing the reflected light beam 232, and optionally communicating temperature data to other circuits or logic 210 in communication with the pyrometer 205. In particular, the electronics portion 206 includes a light beam source 212, a light beam detector 214, and an analysis and control module 216. To cut down on stray blackbody radiation, the pyrometer includes a baffles 208 that blocks a substantial amount of stray blackbody radiation from reaching the light beam detector 214. The baffles 208 can be cooled in order to reduce stray blackbody radiation from the baffles 208 itself.

The analysis and control module 216 can instruct the light beam source 212 to project the light beam 230 towards the substrate 202 via control of the power and timing of the light beam 230. The light beam 230 reflects off the substrate 202 and returns to the pyrometer 205 as the reflected light beam 232, which is detected by the light beam detector 214. The light beam detector 214 provides a signal to the analysis and control module 216 giving information regarding the reflected light beam 232 (e.g., photocurrent $P(\lambda)$). The analysis and control module 216 can use this information along with information regarding the amount of light generated by the light beam source 212 to determine a reflectance R of the substrate 202, which also gives an emissivity of the substrate as $\epsilon = 1 - R$. Reflectance R of the substrate 202 is given as the ratio of the amount of light detected by the light beam detector 214 over the amount of light directed at the substrate 202 by the light beam 230 (e.g., reflected intensity of light or second intensity divided by emitted intensity of light or first intensity). The analysis and control module 216 also knows a wavelength $\lambda$ at which the light beam 230 was generated, and an attenuation factor $\alpha$ that can account for a view factor and a sensor factor (e.g., a percentage of light intensity transmitted through the pyrometer 205 window and/or a view window 207 of the processing chamber 200). With these parameters, Equation 3 can be solved for a temperature of the substrate T.

However, such a temperature measurement can be inaccurate since it does not distinguish between blackbody radiation from the substrate 202 and stray blackbody radiation 234 from stray blackbody sources such as the substrate holder 204. For purposes of this disclosure, stray blackbody radiation refers to blackbody radiation from anything other than the substrate 202 that reaches the light beam detector 214 whether directly or via one or more reflections. For instance, blackbody radiation from the baffles 208 that directly impinges on the light beam detector 214 as well as blackbody radiation from the baffles 208 that reflects off the substrate 202 and impinges on the light beam detector 214, are both considered stray blackbody radiation. To account for stray blackbody radiation, a photocurrent for each blackbody source can be added to Equation 3. For instance, Equation 4 has an additional term $P(\lambda)_{b1}$ added to the photocurrent of Equation 3 to account for the blackbody radiation from a stray blackbody source such as the substrate holder 204 or a heating element.

$$P(\lambda) = \frac{c_1 \epsilon_t \alpha_t}{\lambda^5} \left[ e^{\frac{c_2}{\lambda T}} - 1 \right]^{-1} + P(\lambda)_{b1} \quad \text{(Equation 4)}$$

When $P(\lambda)_{b1}$ is expanded, Equation 4 can be written as:

$$P(\lambda) = \frac{c_1 \epsilon_t \alpha_t}{\lambda^5} \left[ e^{\frac{c_2}{\lambda T_t}} - 1 \right]^{-1} + \frac{c_1 \epsilon_{b1} \alpha_{b1} R_t}{\lambda^5} \left[ e^{\frac{c_2}{\lambda T_{b1}}} - 1 \right]^{-1} \quad \text{(Equation 5)}$$

Equation 5 shows that the stray blackbody radiation $P(\lambda)_{b1}$ depends at least on the temperature of the stray blackbody source $T_{b1}$ along with the wavelength $\lambda$ of the light beam 230, a reflectance $R_t$ of the substrate 202 (e.g., the intensity of the reflected light beam 232, or first intensity, divided by the intensity of the light beam 230, or second intensity), emissivity $\epsilon_{b1}$ of the blackbody source, and an attenuation factor $\alpha_{b1}$ that accounts for at least a sensor factor and a view factor of the blackbody source. View factor is a percentage of light emanating from a source that is incident on a given target. Sensor factor represents a percentage of the light incident on the given target that is detected (e.g., there can be losses due to reflection and absorption in optics of the detector). The terms $\epsilon_{b1} \alpha_{b1}$ can be simplified into a term, $k_{b1}$. While most terms can be measured during a temperature measurement, $k_{b1}$ cannot, and thus a calibration is made to determine $k_{b1}$, which can then be used in Equation 5 to determine the substrate 202 temperature $T_t$ during a temperature measurement.

The calibration can be part of a two-phase non-contact measurement of the substrate 202 temperature $T_t$. First, a calibration measurement can be made in a calibration phase and then a non-contact measurement in a non-contact measurement phase. The calibration measurement can involve solving Equation 6 (below) for $k_{b1}$ (or $\epsilon_{b1} \alpha_{b1}$), where Equation 6 is the same as Equation 5, but rewritten in terms of $k_{b1}$ and performed with a reference substrate substituted for the substrate 202. The reference substrate can be substituted for the substrate 202 during the calibration phase since a contact measurement for temperature could damage the substrate 202, which may have a variety of delicate films and structures on its surfaces. The reference substrate is thus used in place of the substrate 202 for this measurement, and should have similar if not identical characteristics and quality to that of the substrate 202. To clearly show that Equation 6 applies to the reference substrate, Equation 6 can be rewritten in terms of reflectance of the reference substrate $R_{ref}$ and a temperature of the reference substrate $T_{ref}$ rather than in terms of $R_t$ and $T_t$.

$$P(\lambda) = \frac{c_1 \epsilon_{ref} \alpha}{\lambda^5} \left[ e^{\frac{c_2}{\lambda T_{ref}}} - 1 \right]^{-1} + \frac{c_1 k_{b1} R_{ref}}{\lambda^5} \left[ e^{\frac{c_2}{\lambda T_{b1}}} - 1 \right]^{-1} \quad \text{(Equation 6)}$$

Solving Equation 6 for $k_{b1}$ can involve first measuring the first temperature $T_{ref}$ of the reference substrate via the temperature monitor 218, the first temperature $T_{b1}$ of the stray blackbody source (e.g., the substrate holder 204) via one of the temperature monitors 220, 222, and the first reflectance $R_{ref}$ of the reference substrate via the light beam source 212, the light beam detector 214, and the control module 216. The emissivity $\epsilon_{ref}$ of the reference substrate is given as $\epsilon_{ref} = 1 - R_{ref}$, the attenuation factor $\alpha$ of the substrate term can be a value determined by the manufacturer for each pyrometer produced, and the wavelength $\lambda$ is the wavelength of the light beam 230.

With the value of $k_{b1}$, or at least having made the measurements of the reference substrate temperature $T_{ref}$, the first blackbody source temperature $T_{b1}$, and the reference substrate reflectance $R_{ref}$, the non-contact measurement can be made in the non-contact measurement phase. If a reference substrate was used, then the reference substrate can be replaced with the substrate 202 intended for processing and the temperature monitor 218 can be removed or decoupled from the reference substrate. In an alternative embodiment in which a reference substrate is not used, the temperature monitor 218 can be decoupled from the substrate 202. A second temperature $T'_{b1}$ of the stray blackbody source can be measured via a temperature monitor (e.g., 220 or 222) coupled to the stray blackbody source (e.g., the substrate holder 204, the baffles 208, or a heating element, to name three non-limiting examples) since the stray blackbody source likely increased in temperature when the temperature in the processing chamber increased. Also, a reflectance $R_t$ of the substrate 202 (or target) can be determined as a ratio of intensity of the light detected by the light beam detector 214 (e.g., photocurrent in the light beam detector 214), the second intensity, divided by an intensity of light emitted by the light beam source 212, the first intensity. These values can be substituted into Equation 7 (below) and Equation 7 can be solved for the temperature of the substrate $T_t$.

$$P(\lambda) = \frac{c_1 \epsilon_t \alpha}{\lambda^5} \left[ e^{\frac{c_2}{\lambda T_t}} - 1 \right]^{-1} + \frac{c_1 k_{b1} R_t}{\lambda^5} \left[ e^{\frac{c_2}{\lambda T'_{b1}}} - 1 \right]^{-1} \quad \text{(Equation 7)}$$

Although the reference substrate and the substrate 202 can be similar if not identical materials, a reflectance measurement for both ($R_{ref}$ and $R_t$) can still be made. For instance, this may be desired where the substrate 202 is at a higher temperature than the reference substrate. In an alternative embodiment, a single reflectance measurement can be taken, either on the substrate 202 or the reference substrate, and the value can be used in both Equations 6 and 7.

In an alternative embodiment, rather than solving for $k_{b1}$ and then substituting $k_{b1}$ into Equation 7, the values for the reflectance of the reference substrate $R_{ref}$, the first temperature of the stray blackbody source $T_{b1}$, and the temperature of the reference substrate $T_{ref}$ can be measured, followed by a replacement of the reference substrate with the substrate 202, a ramping of the temperature, and then measurements of reflectance $R_t$ of the substrate 202 and second temperature of the stray blackbody source $T'_{b1}$. Then the temperature of the substrate $T_t$ can be calculated using Equations 6 and 7 in combination with these measured values to solve for the temperature of the substrate $T_t$ via a single calculation. In other words, equation 6 can be solved for $k_{b1}$, and the solution for $k_{b1}$ can be substituted into Equation 7 and then solved for the temperature of the substrate $T_t$.

The calibration measurement can be made using a reference substrate—a substrate other than the one that will be measured during the non-contact measurement. Alternatively, the calibration measurement can be performed on the substrate 202 to be processed, but at a temperature at which a contact measurement can be made via the temperature monitoring device 218 (e.g., via thermocouple). Once the calibration measurement has been performed, the temperature monitoring device 218 can be decoupled from the substrate 202 and processing of the substrate 202 can begin.

The substrate 202 and reference substrate are embodiments of a target and reference target. The target and reference target can include objects to be processed that include, but are not limited to substrates and reference substrates. For instance, a polymer or glass sheet for photovoltaic manufacturing can be a target or reference target.

Equations 4-7 account for the blackbody radiation of a single source. Such a source can typically be a heating element that is at a much greater temperature than any other objects in the processing chamber 200. Thus, there may not be a need to account for any more than one stray blackbody source. However, in the event that more than one stray blackbody source is to be accounted for, one skilled in the art will recognize that Equation 4 can be expanded beyond two terms, with each additional term accounting for a separate stray blackbody source. For instance, in Equation 8 (below) two photocurrent terms $P(\lambda)_{b1}$ and $P(\lambda)_{b2}$ are added to the target photocurrent term $P(\lambda)_t$ to account for two different stray blackbody radiation sources (e.g., the substrate holder 204 and a heating element).

$$P(\lambda) = P(\lambda)_t + P(\lambda)_{b1} + P(\lambda)_{b2} \quad \text{(Equation 8)}$$

The term $P(\lambda)_t$ is the photocurrent of the substrate 202 as given by Equation 3, the term $P(\lambda)_{b1}$ is the photocurrent attributable to a first stray blackbody source and equals $$\frac{c_1 k_{b1} R}{\lambda^5} \left[ e^{\frac{c_2}{\lambda T_{b1}}} - 1 \right]^{-1},$$

and the term $P(\lambda)_{s2}$ is the photocurrent attributable to a second stray blackbody source and equals $$\frac{c_1 k_{b2} R}{\lambda^5} \left[ e^{\frac{c_2}{\lambda T_{b2}}} - 1 \right]^{-1}.$$

As seen, the photocurrent of each of the stray blackbody sources depends at least in part on a temperature of each stray blackbody source $T_{b1}$ and $T_{b2}$, respectively. The emissivity and attenuation factor of the first stray blackbody source are represented by $k_{b1}$ and by $k_{b2}$ for the second stray blackbody source. The reflectance R represents that of the reference substrate or the substrate 202, depending on whether Equation 8 is being used in the calibration or the non-contact measurement phase. In embodiments such as that modeled by Equation 8 where there are multiple stray blackbody sources and thus two or more k values, a matrix of results can be determined, which can then be interpolated based on weighing of the two or more stray blackbody sources to determine the two or more k values.

Referring to Equation 6, in various alternative embodiments, once k is determined, an array or table of substrate 202 temperatures $T_t$ can be calculated as a function of reference substrate temperature $T_{ref}$, stray blackbody source temperature $T_b$, wavelength $\lambda$, reference substrate reflectance $R_{ref}$, and substrate 202 reflectance $R_t$. In such embodiments, the temperature of the substrate $T_t$ is essentially pre-calculated such that during the non-contact measurement, the temperature of the substrate $T_t$ can be looked up in the array or table.

Figure 8:
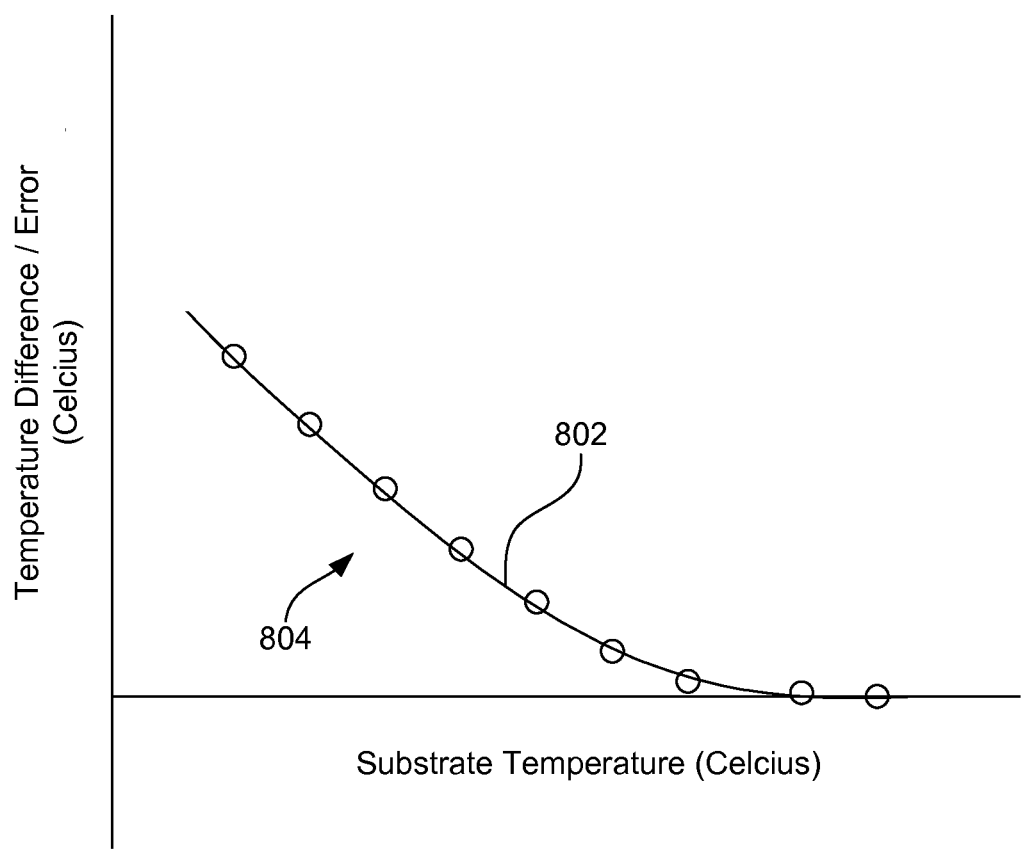
FIG. 8 illustrates a plot of temperature data according to an embodiment of this disclosure.

An array or table can lead to discontinuity between values. In other words, given changing conditions or temperatures in the processing chamber, the calculated value of the substrate temperature $T_t$ does not change smoothly, but jumps between values in the array or table. This can be challenging for a control system to handle and for a human engineer to analyze if looking for continuous data trends. Thus, in the alternative to using a table or array, a polynomial can be used in combination with a least squares fit to the polynomial to solve for the substrate 202 temperature $T_t$. In a particular embodiment, a second or fourth-order polynomial can be used to model a temperature to be subtracted from the measured temperature (also known as an error function) in order to arrive at a substrate 202 temperature $T_t$ that accounts for the bias of stray blackbody radiation. In other words, the polynomial can predict measured substrate temperature (e.g., based on a pyrometer readout) as a function of actual substrate temperature. Performing a least squares fit to a polynomial (e.g., a fourth-order polynomial) enables a smooth and continuous accounting of the temperature component attributable to stray blackbody radiation. The data points used to perform the fit comprise one or more pyrometer temperature readings for a reference substrate as a function of different substrate temperatures. FIG. 8, illustrates one exemplary set of data where a polynomial 802 is fitted to data points 804 representing pyrometer temperature reading error (in units of temperature) for different reference substrate temperatures. To arrive at this data set, the reference substrate temperature can be set to a first value, and a difference between the temperature measured by the pyrometer and a temperature of the reference substrate as measured by a thermocouple can be calculated. This difference is plotted as a function of the reference substrate temperature. The reference substrate temperature is then either increased or decreased, and another difference calculated. This procedure continues thus generating the set of temperature differences or errors 804 as a function of reference substrate temperature. The polynomial 802 can then be fitted to the data points 804 via a least squares algorithm.

In another embodiment, the non-contact temperature of the target is determined in a two-phase process. First in a calibration phase, a value for k is determined. Then, in a non-contact measurement phase, the temperature of the target $T_t$ is measured. The non-contact measurement phase can include measuring a reflected intensity of the reflected light beam 232, and subtracting from the reflected intensity an intensity of light attributable to the stray blackbody radiation, for instance by subtracting photocurrents $P(\lambda)_{b1}$ and $P(\lambda)_{b2}$ as defined with reference to Equation 8. The non-contact measurement phase can then include calculating or recalculating the target temperature $T_t$ based on the reflected intensity of light minus the intensity of light attributable to the stray blackbody radiation.

The baffles 208 is viewed in cross section, and as illustrated is a tube that can be made from a variety of preferably light-absorbing materials, although reflective and light-scattering materials can also be used. In an embodiment, the baffles 208 can have a textured surface that helps scatter and absorb stray blackbody radiation 234 such that less of the stray blackbody radiation 234 reaches the light beam detector 214. The baffles 208 can be arranged as close to the substrate 202 as possible without contacting the substrate 202 so that an amount of stray blackbody radiation 234 reaching the light beam detector 214 is reduced. The baffles 208 is shown as being separated from the substrate holder 204—passing through an opening, hole, or gap in the substrate holder 204. However, in some embodiments, the baffles 208 can be coupled to the substrate holder 204 via an insulating material or device such as a washer. The baffles 208 can be coupled to a view window 207 of the processing chamber 200.

Although illustrated as a hollow tube, in an embodiment, the baffles 208 can be a solid cylinder of waveguide material (e.g., a fiber optic or tube of sapphire or glass). Such a waveguide material could further prevent stray blackbody radiation 234 from reaching the light beam detector 214 since some stray blackbody radiation 234 able to reflect off the substrate 202 and enter the tubular baffles 208 illustrated in FIG. 2, would partially reflect off an end of a waveguide baffles (e.g., when incident at greater than the critical angle for total internal reflection). This affect is attributable to the higher index of refraction of the waveguide baffles (e.g., glass or sapphire) versus the vacuum or processing chamber gas in which the stray blackbody radiation 234 travels through before impinging on the waveguide baffles. Such a waveguide baffles may also have the benefit of allowing the electronics portion 206 to be located further from the substrate 202 or the processing chamber 200 (e.g., where a fiber optic feeds from a pyrometer 205 outside the processing chamber to the substrate 202 within the processing chamber). A waveguide baffles could also have a light-reflecting or light-absorbing coating or material on an outer surface to prevent stray light and blackbody radiation 234 from entering the waveguide baffles via a side of the waveguide baffles.

In some variations, the baffles 208 can be cooled to below room temperature including temperatures which greatly reduce blackbody radiation emitted in wavelengths overlapping with that of the emitted light beam 230 (e.g., infrared wavelengths). For instance, the baffles 208 can be cooled to between 0 C.° and 20 C.°. The baffles 208 can be cooled via thermal coupling with a cooling device (not illustrated) such as a liquid cooling system, for example.

The light beam source 212 can be implemented with any number of light generating devices such as diode lasers and light emitting diodes. The light beam 230 can be collimated, can have a narrow or broad wavelength bandwidth, and can change wavelength during measurements in order to perform multi-wavelength non-contact measurements.

The light beam detector 214 can be implemented with any number of light detecting devices such as photodiodes, photomultipliers, charge-coupled devices, calorimeters, and photodetectors to name just a few non-limiting examples.

In the illustrated embodiment, the temperature monitors 220, 222 coupled to stray blackbody sources can be used to measure the temperature of the substrate holder 204 and the baffles 208, respectively and the temperature monitor 218 can be used to measure the temperature of a reference substrate, and optionally the substrate 202. A thermocouple is an exemplary temperature monitor 218, 220, 222, although one skilled in the art will recognize that other temperature monitoring devices can also be used.

One skilled in the art will also recognize that the light beams 230, 232 and stray blackbody radiation 234 are not drawn to scale, and the angles of the beams may not be entirely accurate. For instance, the light beam 230 and the reflected light beam 232 may be substantially parallel. One skilled in the art will also recognize that the arrangement of components within the electronics portion 206 is merely illustrative. For instance, the light beam source 212 and light beam detector 214 need not be separated as illustrated, but could be coupled to each other, adjacent to each other, overlapping, or even built into a single device or circuit board or system-on-a-chip. The light beam source 212, light beam detector 214, and analysis and control module 216 can all be built into a single device or circuit board, or system-on-a-chip.

Figure 3:
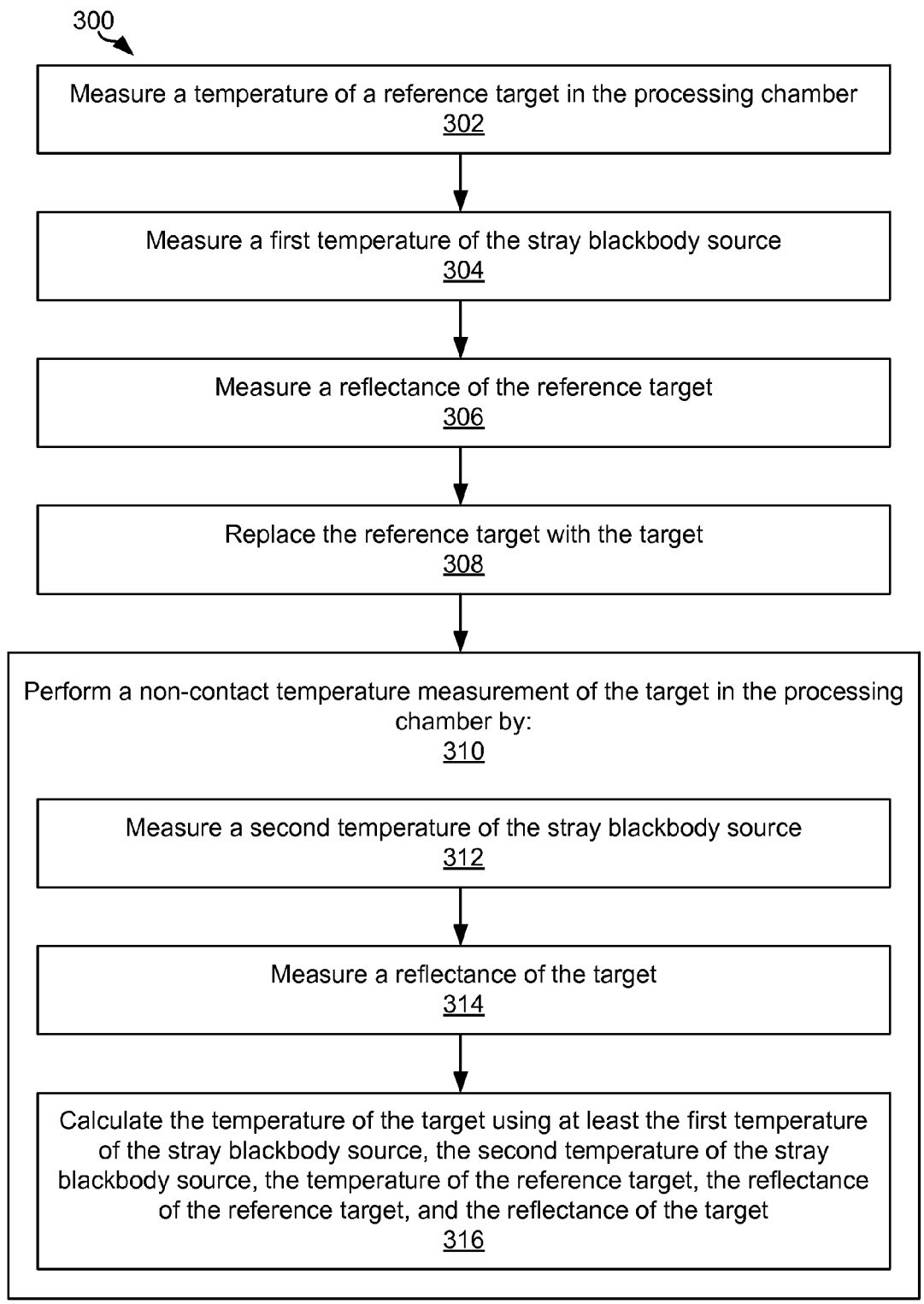
FIG. 3 illustrates a method of performing a non-contact temperature measurement.

FIG. 3 illustrates a method 300 of making a non-contact temperature measurement of a substrate inside a processing chamber that accounts for stray blackbody radiation. The method 300 includes a measure a first temperature of a reference target in the processing chamber operation 302, a measure a temperature of the stray blackbody source operation 304, a measure a reflectance of the reference target operation 306, a replace the reference target with the target operation 308, and a perform a non-contact temperature measurement of the target in the processing chamber operation 310 where the perform operation 310 further includes a measure a second temperature of the stray blackbody source operation 312, a measure a reflectance of the target operation 314, and a calculate the temperature of the target operation 316.

The measure a temperature of the reference target operation 302 can involve measuring a temperature (e.g., via a thermocouple) of the reference target (e.g., a reference substrate) during a calibration phase where the reference target is not heated to processing temperatures, but rather is measured at temperatures around room temperature.

The measure a first temperature of the stray blackbody source operation 304 can involve measuring a temperature (e.g., via a thermocouple) of the stray blackbody source (e.g., a heating element, the substrate holder, the chamber walls, to name a few non-limiting examples).

The measure a reflectance of the reference target operation 306 can involve reflecting a light beam off the reference target and comparing an intensity of reflected light to an intensity of emitted light. For instance, the reflectance can equal a ratio of the reflected light divided by the emitted light.

The replace the reference target with the target operation 308 can take place after a temperature of the reference target, temperature of the stray blackbody source, and reflectance of the reference target have been measured. A determination of emissivity or an array of emissivities for different stray blackbody source temperatures can be determined prior to the replace operation 308.

The perform operation 310 can include a number of sub-operations as discussed in the following. The measure a second temperature of the stray blackbody source operation 312 can involve measuring a temperature (e.g., via a thermocouple) of the stray blackbody source once the processing chamber has been raised to a processing temperature (e.g., 600° C.). The measure a reflectance of the target operation 314 can involve reflecting a light beam off the target and comparing an intensity of reflected light to an intensity of emitted light. For instance, the reflectance can equal a ratio of the reflected light divided by the emitted light. The calculate the temperature of the target operation 316 can calculate the temperature of the target based on or as a function of at least the following: the first temperature of the stray blackbody source, the second temperature of the stray blackbody source, the temperature of the reference target, the reflectance of the reference target, and the reflectance of the target. In one embodiment, an emissivity for the stray blackbody source can be calculated based on the first temperature of the stray blackbody source, the temperature of the reference target, and the reflectivity of the reference target. This emissivity can then be used in concert with the second temperature of the stray blackbody source and the reflectance of the target to calculate the temperature of the target. In yet another embodiment, an array of emissivity values can be determined for different temperatures of the stray blackbody source, and this array can be used to calculate a temperature of the target.

Figure 4A:
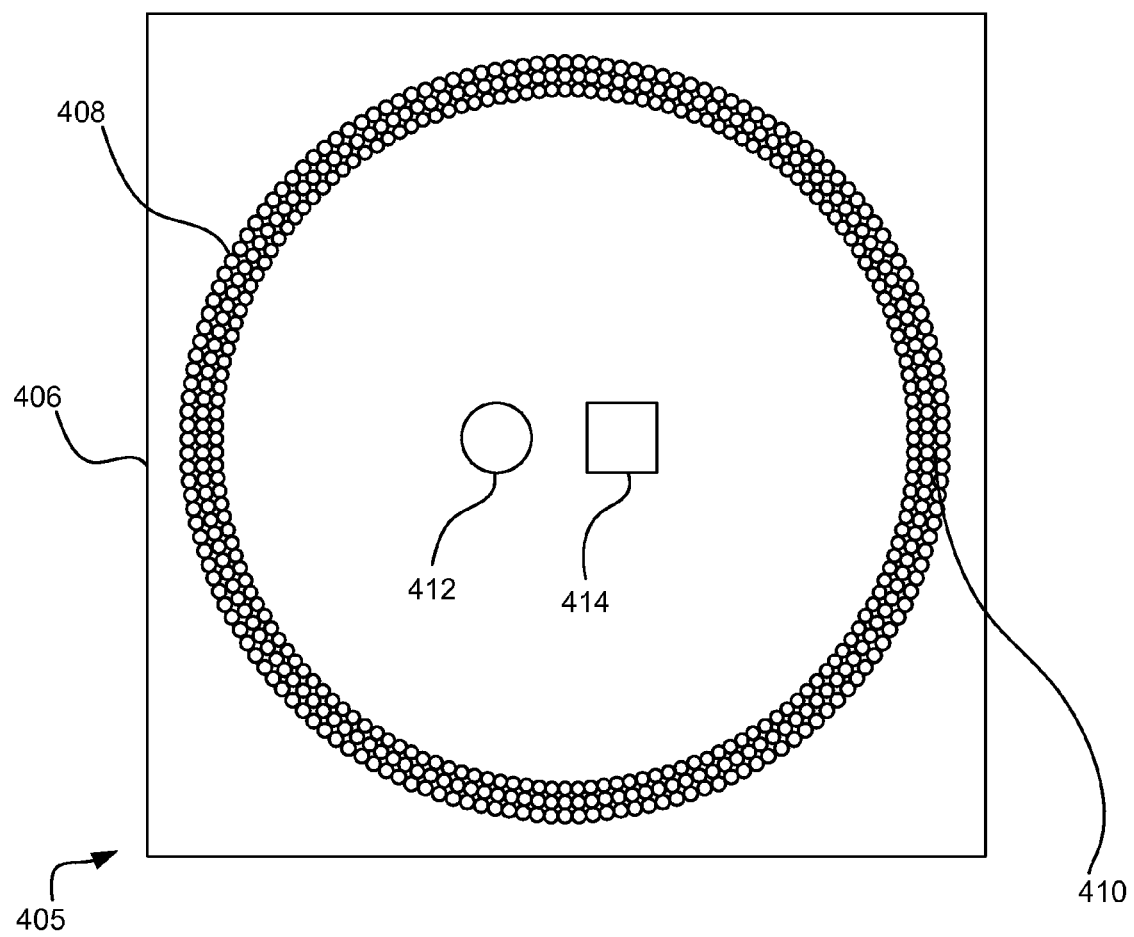
FIG. 4a illustrates an overhead view of an embodiment of a pyrometer having a baffles.
Figure 4B:
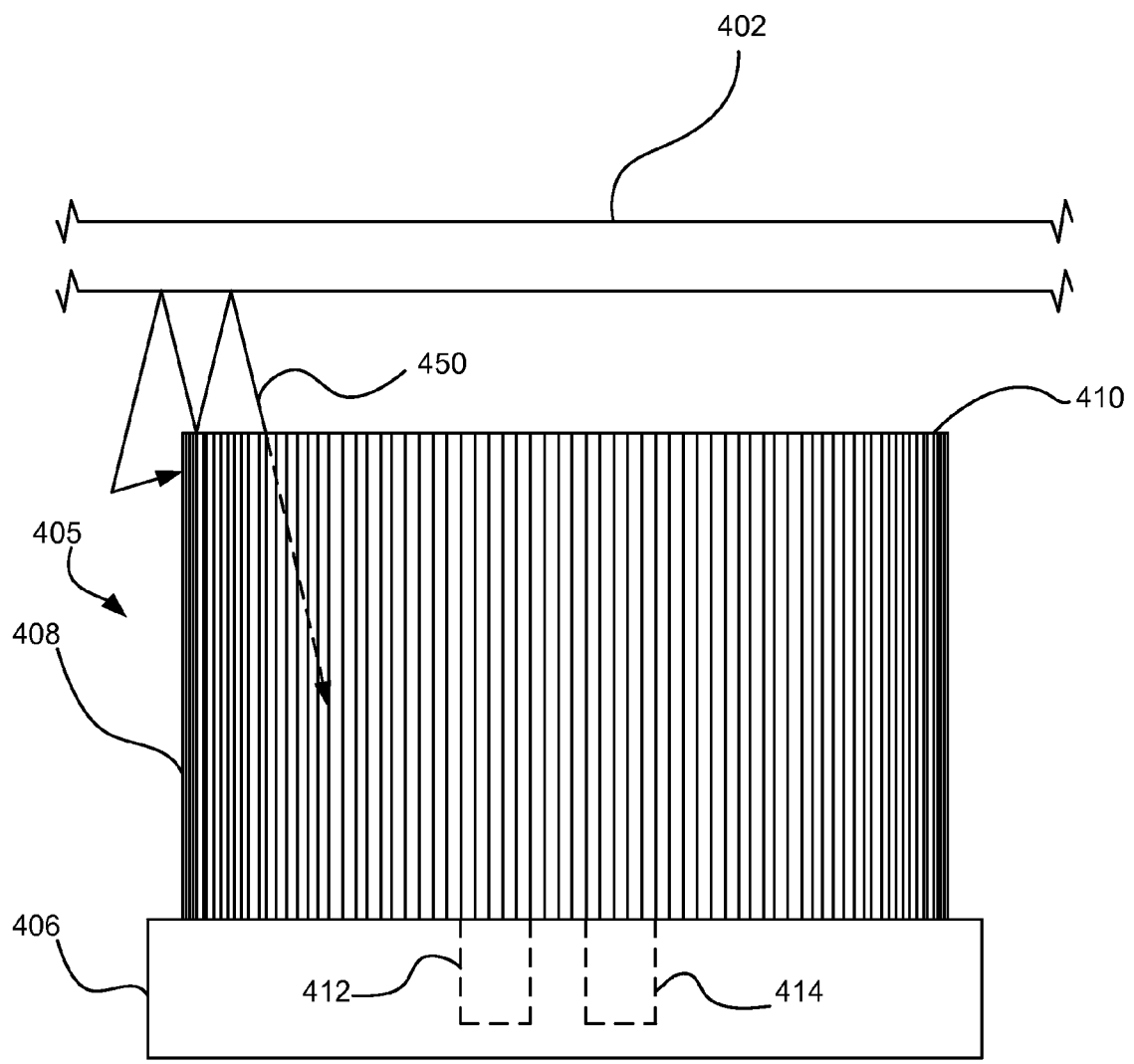

FIGS. 4a and 4b illustrate a top and side view, respectively, of an embodiment of the baffles 408 of a pyrometer 405. Non-contact temperature measurements as disclosed herein typically take place in an environment devoid of non-blackbody light sources (e.g., with the lights off or obstructed). The baffles 408 can prevent stray blackbody radiation from passing through it and striking the light beam detector 414. However, some stray blackbody radiation 450 can reflect off the substrate 402, then off an end of a baffles 410, off the substrate 402 again, and then impinge on the light beam detector 414 (more than one reflection of an end of a baffles 410 is also possible).

To reduce this stray blackbody radiation 450, the baffles 408 can have a light-absorbing end 410. For instance, the baffles 408 can be made of a plurality of concentric rings of tubes coupled to each other or arranged adjacent to each other (as viewed from above in FIG. 4a), and arranged such that light cannot pass through the baffles 408 from a side of the baffles. However, these tubes are also of such a diameter (e.g., 2-10 mm) that when the stray blackbody radiation 450 impinges on the end of the baffles 410, the stray blackbody radiation 450 scatters off the tubes and generally is directed downward in FIG. 4b towards the electronics portion 406 rather than reflecting back towards the substrate 402 (the stray blackbody radiation 450 is illustrated to show the reflections off of a non-absorbing end of a baffles rather than a light-absorbing baffles as discussed in this paragraph). As the stray blackbody radiation 450 scatters back and forth between the tubes, each scattering results in absorption, and eventually the stray blackbody radiation 450 is absorbed or substantially absorbed in the tubes. In other words, the tubes act as a near-perfect light absorber. While three concentric rings of tubes are illustrated, more or less than three concentric rings of tubes can also be implemented.

In an embodiment, a similar effect to using tubes for the baffles 408 can be achieved by coating the end of the baffles 410 with a light-absorbing textured material such as gold black.

The baffles 408 is coupled to an electronics portion 406 that houses at least a light beam source 412 (e.g., a laser diode) and a light beam detector 414 (e.g., photodiode). The light beam source 412 and light beam detector 414 can be adjacent to a center of the baffles 408 (as viewed from above in FIG. 4a), but can also be arranged in any number of other configurations.

Figure 5:
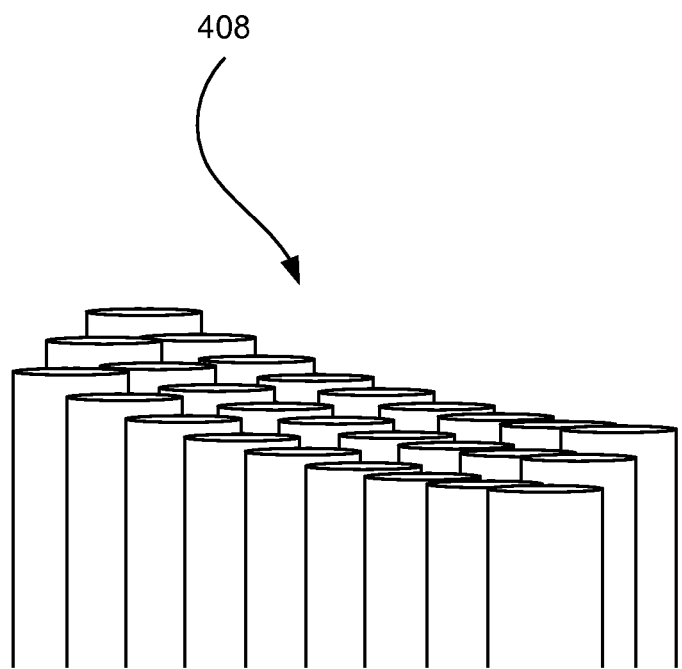
FIG. 5 illustrates an isometric view of a portion of the baffles illustrated in FIGS. 4a and 4b.

FIG. 5 illustrates a close-up isometric view of a portion of the baffles 408 of FIG. 4. The spacing between each concentric ring of the baffles 408 is not limited, however it will depend on the wavelength of infrared light emitted from the light beam source 412. The spacing between baffles 408 in a given concentric ring can also depend on the wavelength of light emitted from the light beam source 412. For shorter wavelengths of light, the baffles 408 can be more closely arranged. The baffles 408 can be hollow or solid cylinders.

The concept behind the baffles 408 made of tubes in FIG. 4 is that a structure that is very tall relative to its diameter presents little surface area for light reflection, and presents a large area for scattering and redirecting the light in substantially the same direction that the light was originally traveling. Other shapes can also achieve a similar affect, and some non-limiting examples are discussed with reference to FIGS. 6-7.

Figure 6:
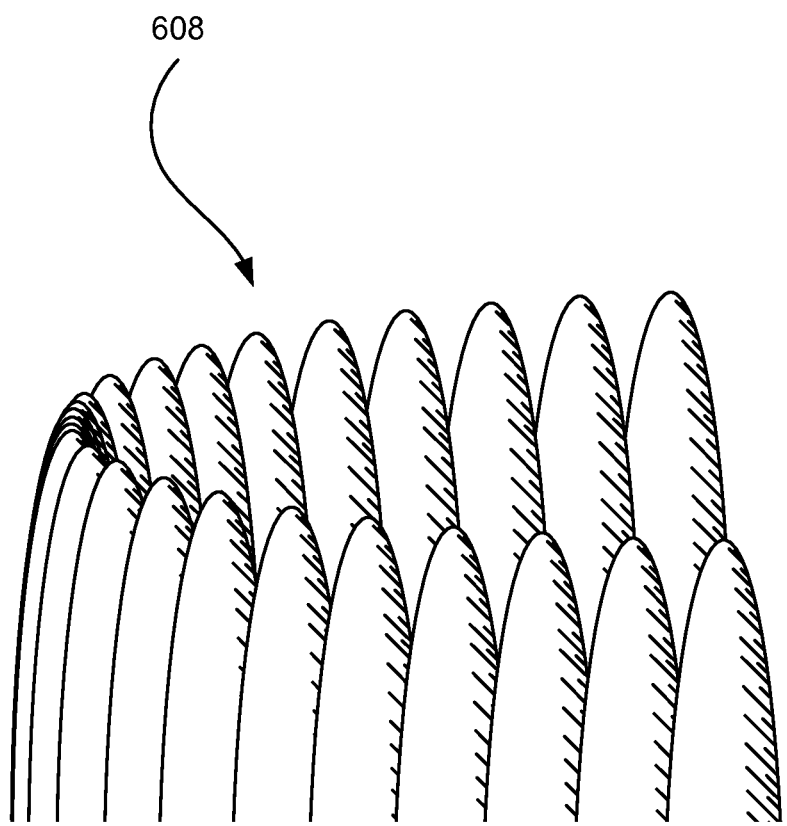
FIG. 6 illustrates an isometric view of another embodiment of a baffles.

FIG. 6 illustrates a close-up view of a portion of an end of an embodiment of a baffles 608 with a single concentric ring of round-ended or needle-tipped tubes. The round-ended or needle-tipped tubes may have less reflective area provided to stray blackbody radiation than concentric rings of tubes as in FIGS. 4a, 4b, and 5. Only one ring of needle-tips is illustrated, but in other embodiments there can be a plurality of concentric rings of needle-tips.

Figure 7:
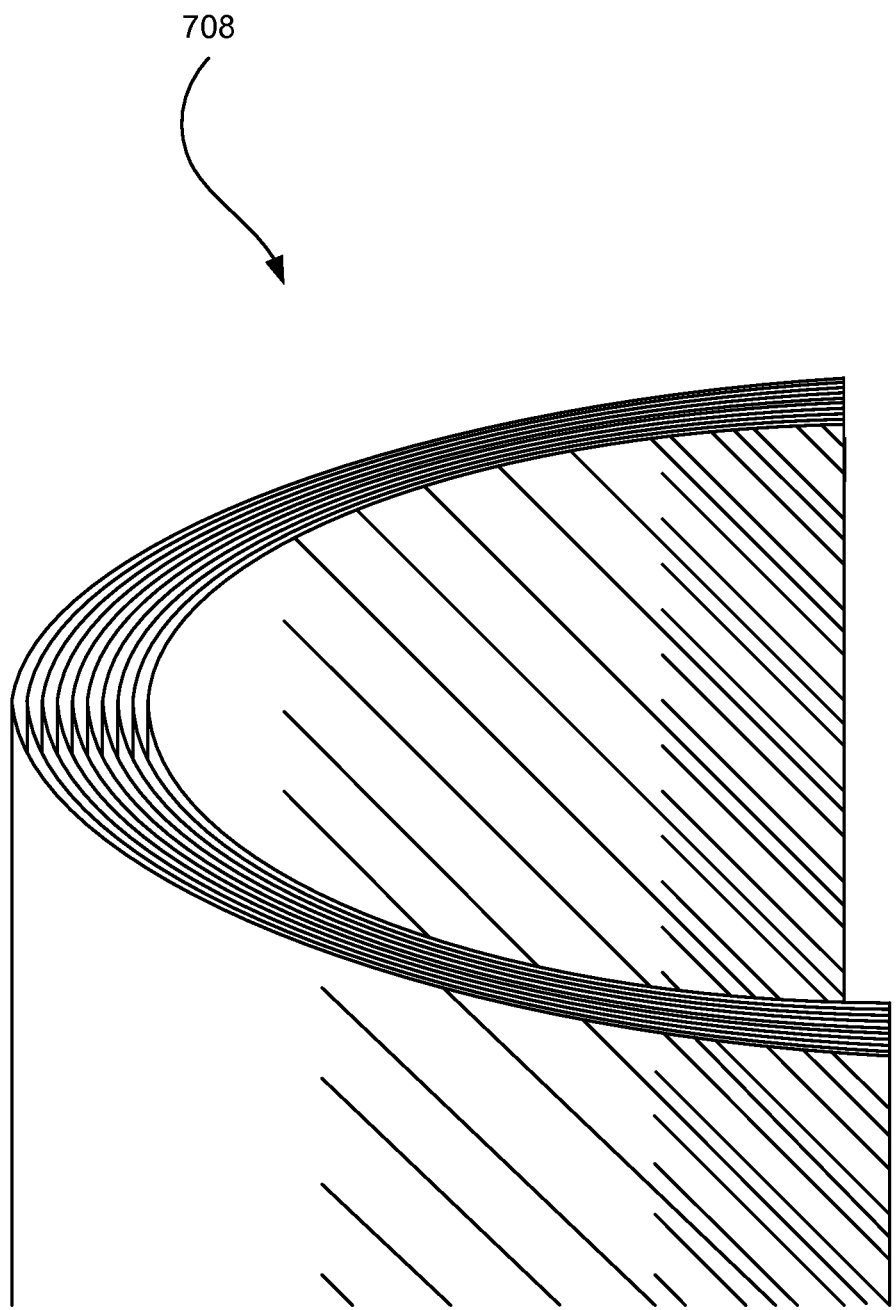
FIG. 7 illustrates yet another isometric view of another embodiment of a baffles.

FIG. 7 illustrates a close-up view of a portion of an end of an embodiment of a baffles 708 made with a plurality concentric rings. These concentric cylinders act similarly to the tubes of FIGS. 4a, 4b, and 5 in that light has very little surface area to reflect off of and instead a majority of light scatters off of sides of each ring in a direction generally opposite to the direction of the substrate until enough scattering has occurred to substantially absorb all of the stray blackbody radiation.

FIGS. 6-7 show just two examples of the myriad forms that such a light-absorbing baffles can take. The general idea being that the baffles comprise a structure presenting very little surface area for reflections of stray blackbody radiation back towards the substrate, and instead cause stray blackbody radiation to scatter off sides of the structure and be absorbed by the structure during a plurality of scattering events such that the stray blackbody radiation is substantially absorbed rather than reflected from an end of the baffles.

In conclusion, the present invention provides, among other things, a method, system, and apparatus that enables non-contact temperature measurements of a semiconducting substrate or other processing target to a degree of accuracy that accounts for or negates stray blackbody radiation. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A method of making a non-contact temperature measurement of a target in a processing chamber comprising:
   measuring a temperature of a reference target in the processing chamber;
   measuring a first temperature of a stray blackbody source;
   measuring a reflectance of the reference target; and
   replacing the reference target with the target; and
   performing a non-contact temperature measurement of the target in the processing chamber by:
      measuring a second temperature of the stray blackbody source;
      measuring a reflectance of the target by:
         emitting a light beam incident on the target, where the light beam has a first intensity;
         detecting a reflected portion of the light beam reflected off the target, where the reflected portion has a second intensity;
         calculating the reflectance of the target, as the second intensity divided by the first intensity; and
      calculating a temperature of the target using at least the first temperature of the stray blackbody source, the second temperature of the stray blackbody source, the temperature of the reference target, the reflectance of the reference target, and the reflectance of the target.

2. The method of claim 1, further comprising calculating an emissivity of the stray blackbody source before calculating the temperature of the target, where the calculating an emissivity is a function of at least the temperature of the reference target in the processing chamber, the first temperature of the stray blackbody source, and the reflectance of the reference target.

3. The method of claim 2, further comprising calculating the temperature of the target as a function of the emissivity of the blackbody source, the second temperature of the stray blackbody source, and the reflectance of the target.

4. The method of claim 1, wherein the calculating the temperature of the target comprises:
   subtracting from the second intensity, a blackbody intensity calculated as an intensity attributable to stray blackbody radiation.

5. The method of claim 4, wherein the intensity attributable to the stray blackbody radiation is calculated as a function of:
   emissivity of the stray blackbody source;
   sensor factor of the stray blackbody source;
   the reflectance of the reference target;
   wavelength of the light beam; and
   the first temperature of the stray blackbody source.

6. A non-contact temperature-measuring device comprising:
   a light beam source that emits a light beam having an emitted intensity;
   a light beam detector that detects:
      a first reflected intensity from the light beam reflecting off a reference target; and
      a second reflected intensity from the light beam reflecting off a target;
   a baffles precluding stray blackbody radiation from reaching the light beam detector except via reflection off of the target and reference target;
   a first temperature monitor that measures a first temperature of a stray blackbody source during a calibration phase, and measures a second temperature of the stray blackbody source during a non-contact measurement phase;
   a second temperature monitor that measures a temperature of the reference target;
   a control module that determines:
      a first reflectance of the reference target as a ratio of the first reflected intensity over the emitted intensity;
      a second reflectance of the target as a ratio of the second reflected intensity over the emitted intensity;
      a temperature of the target based on at least:
         the first temperature;
         the second temperature;
         the third temperature;
         the first reflectance; and
         the second reflectance.

7. The non-contact temperature-measuring device of claim 6, wherein the baffles is cooled below room temperature.

8. The non-contact temperature-measuring device of claim 6, wherein stray blackbody radiation is primarily absorbed by an end of the baffles via multiple scattering and absorption events within the baffles.

9. The non-contact temperature measuring device of claim 8, wherein the baffles comprises one or more concentric rings of tubes.

10. The non-contact temperature measuring device of claim 6, wherein an end of the baffles is within 2-5 mm of the target.

11. A non-contact temperature-measuring system comprising:
   a means for measuring a temperature of a reference target;
   a means for measuring a first temperature of a stray blackbody radiation source during a calibration phase and measuring a second temperature of the stray blackbody radiation source during a non-contact temperature measurement phase;
   a means for emitting a first light beam incident on the reference target and emitting a second light beam incident on the target, where the first light beam has a first intensity and the second light beam has a second intensity;
   a means for detecting a reflected portion of the first light beam reflected off the reference target and a reflected portion of the second light beam reflected off the target, where the reflected portion of the first light beam has a third intensity and the reflected portion of the second light beam has a fourth intensity;
   a means for calculating the reflectance of the reference target as the third intensity divided by the first intensity and calculating a reflectance of the target as the fourth intensity divided by the second intensity; and
   a means for calculating a temperature of the target based on at least:
      the temperature of the reference target;

the first temperature of the stray blackbody radiation source;
the second temperature of the stray blackbody radiation source;
the reflectance of the reference target; and
the reflectance of the target.

12. The non-contact temperature-measuring system of claim 11, wherein the first and second intensities are equal.

* * * * *